(12) United States Patent
Gwin

(10) Patent No.: US 11,281,504 B2
(45) Date of Patent: Mar. 22, 2022

(54) DISPOSITION OF A WORKLOAD BASED ON A THERMAL RESPONSE OF A DEVICE

(71) Applicant: Intel Corporation, Santa Clara, CA (US)

(72) Inventor: Paul J. Gwin, Orangevale, CA (US)

(73) Assignee: Intel Corporation, Santa Clara, CA (US)

(*) Notice: Subject to any disclaimer, the term of this patent is extended or adjusted under 35 U.S.C. 154(b) by 967 days.

(21) Appl. No.: 15/783,543

(22) Filed: Oct. 13, 2017

(65) Prior Publication Data

US 2019/0114212 A1 Apr. 18, 2019

(51) Int. Cl.
*G06F 9/50* (2006.01)
*G06F 11/34* (2006.01)
*G06F 11/30* (2006.01)

(52) U.S. Cl.
CPC .......... *G06F 9/5094* (2013.01); *G06F 9/5083* (2013.01); *G06F 11/3024* (2013.01); *G06F 11/3058* (2013.01); *G06F 11/3433* (2013.01)

(58) Field of Classification Search
CPC .. G06F 9/5094; G06F 11/3433; G06F 9/5083; G06F 11/3024; G06F 11/3058; G06F 1/3206; G06F 1/206; G06F 9/4893; Y02D 10/00
See application file for complete search history.

(56) References Cited

U.S. PATENT DOCUMENTS

| 2014/0281609 | A1* | 9/2014 | Hanumaiah | G06F 1/3296 713/320 |
| 2017/0004040 | A1* | 1/2017 | Chinnakkonda Vidyapoornachary | G06F 3/0679 |
| 2017/0364130 | A1* | 12/2017 | Ho | G06F 1/3206 |

* cited by examiner

*Primary Examiner* — Sisley N Kim
(74) *Attorney, Agent, or Firm* — Patent Capital Group

(57) ABSTRACT

Particular embodiments described herein provide for an electronic device that can be configured to receive a plurality of thermal parameters for a device, identify one or more of the plurality of thermal parameters that affect a thermal response of the device, and create a thermal vector for the device using the one or more of the plurality of thermal parameters that affect the thermal response of the device, where the thermal vector can be used to predict a new thermal response of the device. In an example, the thermal vector includes weighted thermal parameters.

20 Claims, 8 Drawing Sheets

DEVICE THERMAL PARAMETERS TABLE — 116

DEVICE 120A THERMAL PARAMETERS

| 158 TIME | 134 TEMP | 136 DEVICE WORKLOAD | 138 FAN SPEED | 140 CPU SPEED | 142 NEIGHBOR 1 TEMP | 144 NEIGHBOR 2 TEMP |
|---|---|---|---|---|---|---|
| 0  | 50 | 70/30  | 1000 RPM | 3.1 GHz | 60 | 60 |
| 10 | 60 | 50/60  | 1500 RPM | 3.5 GHz | 50 | 50 |
| 20 | 70 | 80/30  | 2500 RPM | 4.1 GHz | 60 | 70 |
| 30 | 50 | 20/70  | 2500 RPM | 4.0 GHz | 70 | 60 |
| 40 | 50 | 75/50  | 2000 RPM | 3.7 GHz | 60 | 60 |
| 50 | 70 | 100/40 | 1500 RPM | 3.5 GHz | 50 | 80 |

DEVICE 120B THERMAL PARAMETERS

| 158 TIME | 134 TEMP | 136 DEVICE WORKLOAD | 138 FAN SPEED | 140 CPU SPEED | 142 NEIGHBOR 1 TEMP | 144 NEIGHBOR 2 TEMP |
|---|---|---|---|---|---|---|
| 0  | 60 | 30/70 | 1000 RPM | 3.1 GHz | 50 | 60 |
| 10 | 50 | 10/5  | 1500 RPM | 3.5 GHz | 60 | 60 |
| 20 | 60 | 75/40 | 2500 RPM | 4.1 GHz | 70 | 70 |
| 30 | 70 | 70/30 | 2500 RPM | 4.0 GHz | 50 | 80 |
| 40 | 60 | 50/20 | 2000 RPM | 3.7 GHz | 50 | 70 |
| 50 | 50 | 30/40 | 1500 RPM | 3.5 GHz | 70 | 50 |

FIGURE 3

DISPOSITION OF A WORKLOAD BASED ON A THERMAL RESPONSE OF A DEVICE

TECHNICAL FIELD

This disclosure relates in general to the field of computing and/or networking, and more particularly, to a disposition of a workload based on a thermal response of a device.

BACKGROUND

Emerging network trends in data centers and cloud systems place increasing performance demands on a system. The increasing demands can cause thermal increases in the system. The thermal increases can cause a reduction in device performance and delays in data throughput.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 3 is a simplified block diagram of a portion of a system to enable a disposition of a workload based on a thermal response of a device, in accordance with an embodiment of the present disclosure;

The FIGURES of the drawings are not necessarily drawn to scale, as their dimensions can be varied considerably without departing from the scope of the present disclosure.

DETAILED DESCRIPTION

Example Embodiments

The following detailed description sets forth examples of apparatuses, methods, and systems relating to a system for enabling a disposition of a workload based on a thermal response of a device. The term "thermal response" includes an increase or decrease of temperature or thermal energy. For example, the thermal response of a device means the temperature change (if any) of the device. Features such as structure(s), function(s), and/or characteristic(s), for example, are described with reference to one embodiment as a matter of convenience; various embodiments may be implemented with any suitable one or more of the described features.

In the following description, various aspects of the illustrative implementations will be described using terms commonly employed by those skilled in the art to convey the substance of their work to others skilled in the art. However, it will be apparent to those skilled in the art that the embodiments disclosed herein may be practiced with only some of the described aspects. For purposes of explanation, specific numbers, materials and configurations are set forth in order to provide a thorough understanding of the illustrative implementations. However, it will be apparent to one skilled in the art that the embodiments disclosed herein may be practiced without the specific details. In other instances, well-known features are omitted or simplified in order not to obscure the illustrative implementations.

In the following detailed description, reference is made to the accompanying drawings that form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

Figure 1:
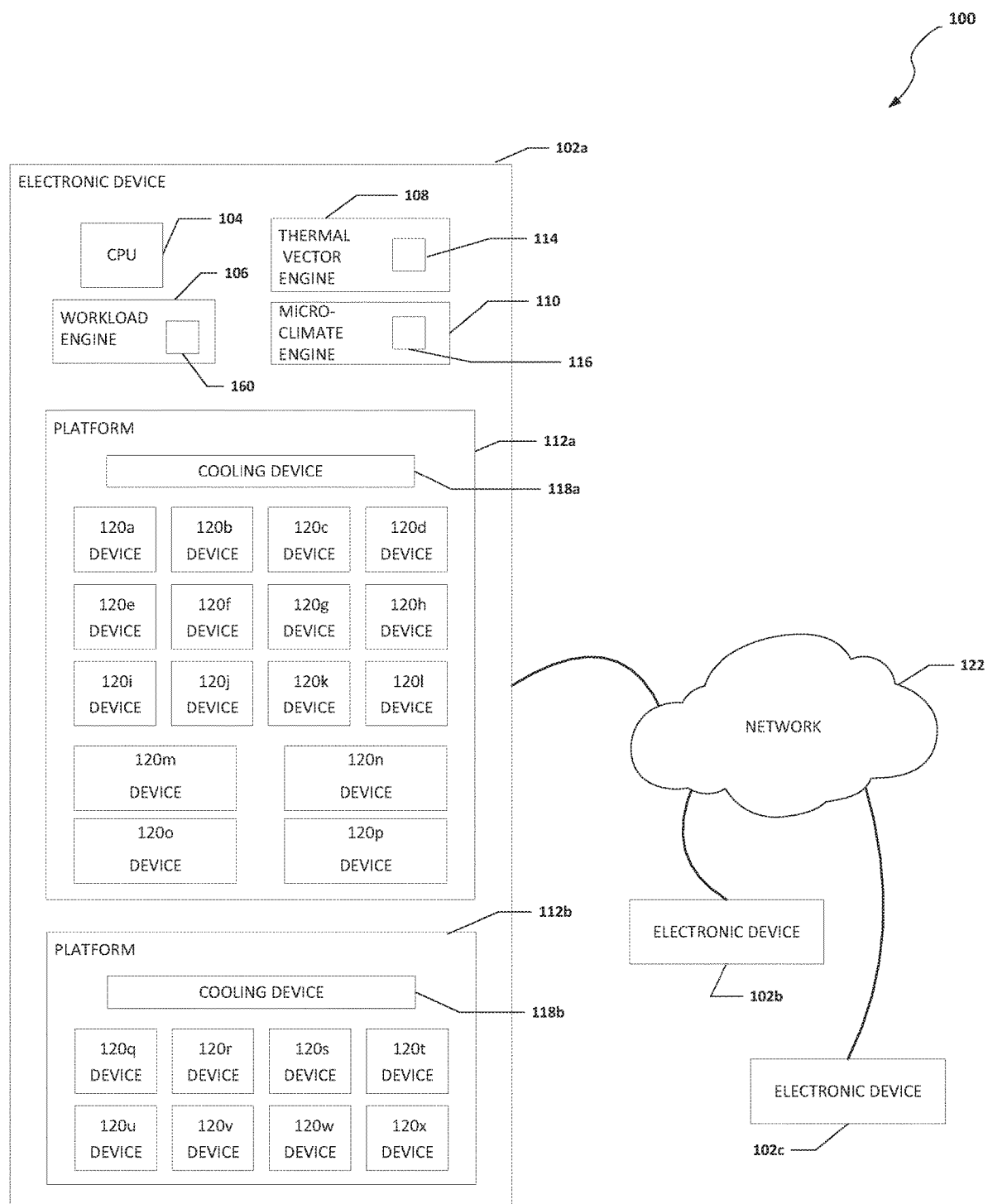
FIG. 1 is a simplified block diagram of a system to enable a disposition of a workload based on a thermal response of a device, in accordance with an embodiment of the present disclosure.

FIG. 1 is a simplified block diagram of an electronic device configured to enable disposition of a workload based on a thermal response of a device, in accordance with an embodiment of the present disclosure. In an example, a system 100 can include one or more electronic devices 102a-102c. Each electronic device 102a-102c can include a computer processing unit (CPU) 104, a workload engine 106, a thermal vector engine 108, a micro-climate engine 110, and one or more platforms 112a and 112b. Workload engine 106 can include a lookup table 160. Lookup table 160 includes data related to previous conditions, parameters, workloads, thermal responses, etc. of the system. Thermal vector engine 108 can include a thermal vector table 114. Micro-climate engine 110 can include a device thermal parameters table 116. Platform 112a can include a cooling device 118a and a plurality of devices 120a-120p. Platform 112b can include a cooling device 118b and a plurality of devices 120q-120x. Electronic devices 102a-102c may be in communication with each other using network 122.

Each of platforms 112a and 112b can be a group of devices available for use by an electronic device (e.g., to execute one or more processes). Each of devices 120a-120x may be memory (e.g., solid-state drives (SSDs), random access memory (RAM), Dynamic RAM (DRAM), etc.), an accelerator (e.g., a field programmable gate array (FPGA), graphics processor, graphics card, chip set, CPU, etc.), power supply, or some other device that may be used during the operation of electronic device 102a. Platforms 112a and 112b may include the same or similar type of devices (e.g., devices 120a-120x are SSDs), platform 112a may include different devices than platform 112b (e.g., devices 120a-120p on platform 112a are SSDs while devices 120q-120x on platform 112b are FPGAs), or platforms 112a and 112b may each include different types of devices (e.g., devices 120a-120l on platform 112a are SSDs while devices 120m-

120p also on on platform 112a are FPGAs). Cooling devices 118a and 118b may each be an air cooling system (e.g., a platform or system fan), water cooling system, or some other device that can be used to cool devices.

Micro-climate engine 110 can be configured to periodically receive and/or determine thermal parameters that can be used to create a thermal vector for a device. The term "thermal parameters" includes a measurement, range, indicator, etc. of an element or condition that affects the thermal response, thermal state, and/or thermal transient characteristics of the device associated with the thermal parameters. The term "thermal vector" includes an algorithm, calculation, formula, etc. that can be used to determine a thermal response or thermal transient rate of change of a device based on thermal parameters.

The thermal parameters can include a platform workload intensity, a CPU workload or processing speed, a data workload of a neighboring device, fan speed, air temperature (e.g., ambient air temperature, temperature of the air inside the platform, etc.), power dissipation of the device, or other indicators that may affect the thermal condition of the device. Thermal vector engine 108 can be configured to use the thermal parameters from micro-climate engine 110 to create a thermal vector for each device. The thermal vector is used to determine how each thermal parameter may affect the thermal response of the device. For example, if the device workload, fan speed, and CPU speed are high, then the thermal response of the device will cause an increase of temperature of the device. In an example, the thermal parameters in the thermal vector can be weighted and each device may have a different thermal vector and/or weight assigned to each thermal parameter. In addition, each device may have different or similar thermal parameters. For example, the thermal vector of device 120a may include a parameter of the temperature of device 120b with a relatively high weight associated with it while the thermal vector of device 120k may not include a parameter of the temperature of device 120b or may include a parameter of the temperature of device 120b but with a relatively low weight associated with it. The term "thermal parameters" includes a measurement, range, indicator, etc. of an element or condition that affects the thermal response, thermal state, and/or thermal transient characteristics of the device associated with the thermal parameters.

Workload engine 106 can be configured to use the thermal vector for each device and determine the effect a workload may have on a device. Workload engine 106 can also be configured to help determine an advanced predictive time to throttle as a function of the workload intensity of a device. Using lookup table 160 workload engine 106 can use previously acquired data related to previous conditions, parameters, workloads, thermal responses, etc. of the system to simulate different scenarios. This can be performed for each device in the system and allow for intelligent and strategic disposition of data workload missions to a device with a time duration capability to allow a device to handle a specific workload before device throttling is required. Each workload can be allocated to each device in the platform to help mitigate the thermal challenges of the platform. By allocating workload to each device in the platform, the system can allocated workloads relative to what a device's thermal response will be to a specific workload. This can improve platform operations (e.g., performance, latency, time to completion, etc.) by reducing the workload of devices at their thermal limit and lower platform fan speed. The reduction in fan speed can allow for power reduction of the platform, reduced acoustic annoyance, reduced fan speed oscillation, etc. The term "thermal limit" includes the temperature at which a device will throttle or limit power and performance in order to not exceed reliability limits. In another example, the allocation of workload to each device can be done in such a way as to try and keep devices at a desired operating temperature. More specifically, some devices are more efficient at a specific temperature range and the workload can be allocated to try and keep each device within the specific temperature range.

It is to be understood that other embodiments may be utilized and structural changes may be made without departing from the scope of the present disclosure. Substantial flexibility is provided by system 100 in that any suitable arrangements and configuration may be provided without departing from the teachings of the present disclosure.

Elements of FIG. 1 may be coupled to one another through one or more interfaces employing any suitable connections (wired or wireless), which provide viable pathways for network (e.g., network 122, etc.) communications. Additionally, any one or more of these elements of FIG. 1 may be combined or removed from the architecture based on particular configuration needs. System 100 may include a configuration capable of transmission control protocol/Internet protocol (TCP/IP) communications for the transmission or reception of packets in a network. System 100 may also operate in conjunction with a user datagram protocol/IP (UDP/IP) or any other suitable protocol where appropriate and based on particular needs.

For purposes of illustrating certain example techniques of system 100, the following foundational information may be viewed as a basis from which the present disclosure may be properly explained. End users have more media and communications choices than ever before. A number of prominent technological trends are currently afoot (e.g., more computing devices, more online video services, more Internet traffic), and these trends are changing the media delivery landscape. Data centers serve a large fraction of the Internet content today, including web objects (text, graphics, Uniform Resource Locators (URLs) and scripts), downloadable objects (media files, software, documents), applications (e-commerce, portals), live streaming media, on demand streaming media, and social networks. In addition, devices and systems, such as data centers, are expected to increase performance and function. However, the increase in performance and/or function causes an increase in the thermal challenges of systems, electronic devices, and platforms.

For example, thermal challenges are always present in SSDs and the problem is growing. A SSD is a solid-state storage device that uses integrated circuit assemblies as memory to store data persistently. Some data centers and/or servers include one or more platforms (e.g., banks or arrays) of SSDs. As increased demands are placed on an SSD, the SSD will heat up. As a result, the SSD will throttle or limit power and performance in order to not exceed reliability limits. This typically occurs before data workload missions are complete and can cause delays in data throughput. Data performance and latency at mission critical times impact the data center quality of service. Further, the thermal ecosystem internal to a platform is constantly changing so a single or multimodal thermal bottleneck commonly and needlessly drives fan speed increases as well as limits performance because fan speed alone typically cannot overcome the increased temperature and resulting throttling.

In addition, the fan speed increase is possibly unnecessarily as the entire platform is cooled instead of an isolated worst thermal condition SSD that may be thermally at its limit. Also, due to the increased fan speed, platform power usage and acoustic energy of the platform is higher than needed. What is needed is a system that can help mitigate the thermal challenges of a system.

A device to help mitigate the thermal challenges of a system, as outlined in FIG. 1, can resolve these issues (and others). An electronic device (e.g., electronic device 102a, 102b, and/or 102c) can be configured to allow for the disposition of a workload based on thermal capability. More specifically, the electronic device can be configured to analyze a workload and thermal parameters for each device that will be used during the workload. Any device that is close to its thermal limit or will be close to its thermal limit can be assigned a relatively light workload while a device that is far from its thermal limit can be assigned a relatively heavier workload. This can help prevent an isolated worst thermal condition device that may be thermally at its limit. In an example, a plurality of sensors can be used to determine the thermal parameters of a device (e.g., device 120a). In another example, the electronic device can be configured to analyze the workload and thermal parameters for each device that will be used during the workload and assign a workload to each device that will keep each device within an efficient temperature range.

A micro-climate engine (e.g., micro-climate engine 110) can be configured to collect or determine thermal parameters for a plurality of device such as platform workload intensity, the influence of a CPU workload on each device, the influence or data workload of a neighboring device, etc. The micro-climate engine can continually update the thermal parameters for each device according to changing platform conditions. The thermal parameters from the micro-climate engine can be used by a thermal vector engine (e.g., thermal vector engine 108) to create a thermal vector for each device. A workload engine (e.g., workload engine 106) can use the thermal vector for each device to determine the effect a workload may have on a device and to help determine an advanced predictive time to throttle as a function of the workload intensity. This can be performed for each device in the system allowing intelligence and strategic disposition of data workload missions to a device with a time duration capability to handle the data workload before device throttling is required. Each workload can be allocated to each device in the platform to help mitigate the thermal challenges of the platform. By allocating the workload to each device based on the thermal parameters relative to each device, the system can allocate operations relative to a device's specific thermal response and help avoid throttle. This can improve platform data operations (e.g., performance, latency, time to completion, etc.) and lower platform fan speed. The reduction in fan speed can allow for power reduction of the platform, reduced acoustic annoyance, reduced fan speed oscillation, etc.

Using the workload engine, mission critical data operations can be assigned based on a priority to a device having the fastest time to mission completion (e.g., in the case of SSDs, completes based on maximum write speed without reduced performance from throttling). The workload engine can use predictive and current thermal parameters when assigning a workload to a device based on a device's thermal capability. If the device is an SSD, the workload engine can disposition each workload according to its disproportionate effect on the SSD's thermal velocity and corresponding time before throttle.

In an example, each device can include an internal temperature sensor that determines the temperature of the device. The device's temperature is reported to the micro-climate engine and stored in a device thermal parameters table (e.g., device thermal parameters table 116 illustrated in FIG. 3). The micro-climate engine reports the device's temperature and other thermal parameters to the thermal vector engine to be used to create a thermal vector table (e.g., thermal vector table 114 illustrated in FIG. 4). The thermal vector table can be used by the workload engine to assign workloads to each device based on a predicted thermal transient time to maximum allowable condition.

The platform may have a few or many devices that will have a thermal influence on each other. For example, devices upstream or adjacent to other device can preheat the air and contribute to a device's thermal response. In addition, the electronic device may have non-drive components that respond to platform operations (data workloads, processing, etc.) and the non-drive components can have a contribution to the device's thermal velocity, (e.g., a video card that is consuming a workload and preheats the air next to the device). To account for the non-drive components, the device's thermal response is a function of thermal workload for the device itself and as well as other thermal parameters (other SSD's, graphics, fans speed, CPU, chipset, etc.). The thermal response of the device can be mapped to platform thermal parameters, however there are also primary, secondary, and nth degree influencers to the device's thermal vector (i.e., the device's thermal transient rate of change) and those are taken into account as illustrated in the thermal vector table illustrated in FIG. 4.

The thermal vector engine can be configured to determine which thermal parameters are primary influencers and the magnitude of the effect a specific thermal parameter has or will have on the thermal response of a specific device. A device's thermal response to different parameters can be determined by periodically logging the device's thermal response and thermal parameters associated with the device when the thermal response was logged. The device's thermal response variation compared to the thermal parameters associated with the device can be used to quantitatively determine the impact of each of the thermal parameters on the device's thermal response by process of elimination of non-impactful thermal parameters. This allows not just the primary influencers but other non-primary influencers (e.g., secondary influencers, tertiary influencers, etc.) to be used when determining an individual device's thermal vector. This allows the ability to predict the time duration from any given real-time thermal condition to when the device has reached its thermal limit, at which time the device performance must be throttled and data operations suffer to protect the device from overheating.

The workload engine can analyze each workload mission write power, sub-power, and duration, ultimately correlating each individual workload mission to the thermal response anticipated for each device. For example, each workload mission is evaluated against each device's current thermal state and its predicted thermal response based on each workload. This allows the workload engine to allocate workloads to respective devices that will complete the workload prior to the device reaching its thermal limit. The result is uninterrupted data missions, increased data operation speed, reduced platform fan speed, and reduced fan speed cycling, and greatly improved data latency reduction.

Turning to the infrastructure of FIG. 1, system 100 in accordance with an example embodiment is shown. Generally, system 100 may be implemented in any type or topology of networks. Network 122 represents a series of points or nodes of interconnected communication paths for receiving and transmitting packets of information that propagate through system 100. Network 122 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In system 100, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Messages through the network could be made in accordance with various network protocols, (e.g., Ethernet, Infiniband, OmniPath, etc.). Additionally, radio signal communications over a cellular network may also be provided in system 100. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. The data may help determine a status of a network element or network. Additionally, messages, requests, responses, and queries are forms of network traffic, and therefore, may comprise packets, frames, signals, data, etc.

In an example implementation, electronic devices 102*a*-102*c*, are meant to encompass network elements, network appliances, servers, routers, switches, gateways, bridges, load balancers, processors, modules, or any other suitable device, component, element, or object operable to exchange information in a network environment. Electronic devices 102*a*-102*c* may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information. Each of electronic devices 102*a*-102*c* may be virtual or include virtual elements.

In regards to the internal structure associated with system 100, each of electronic devices 102*a*-102*c* can include memory elements for storing information to be used in the operations outlined herein. Each of electronic devices 102*a*-102*c* may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in system 100 could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein.

In an example implementation, elements of system 100, such as electronic devices 102*a*-102*c* may include software modules (e.g., workload engine 106, thermal vector engine 108, micro-climate engine 110, etc.) to achieve, or to foster, operations as outlined herein. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, each of electronic devices 102*a*-102*c* may include a processor that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read-only memory (EPROM), an electrically erasable programmable read-only memory (EEPROM)) or an ASIC that includes digital logic, software, code, electronic instructions, or any suitable combination thereof. Any of the potential processing elements, modules, and machines described herein should be construed as being encompassed within the broad term 'processor.'

Figure 2:
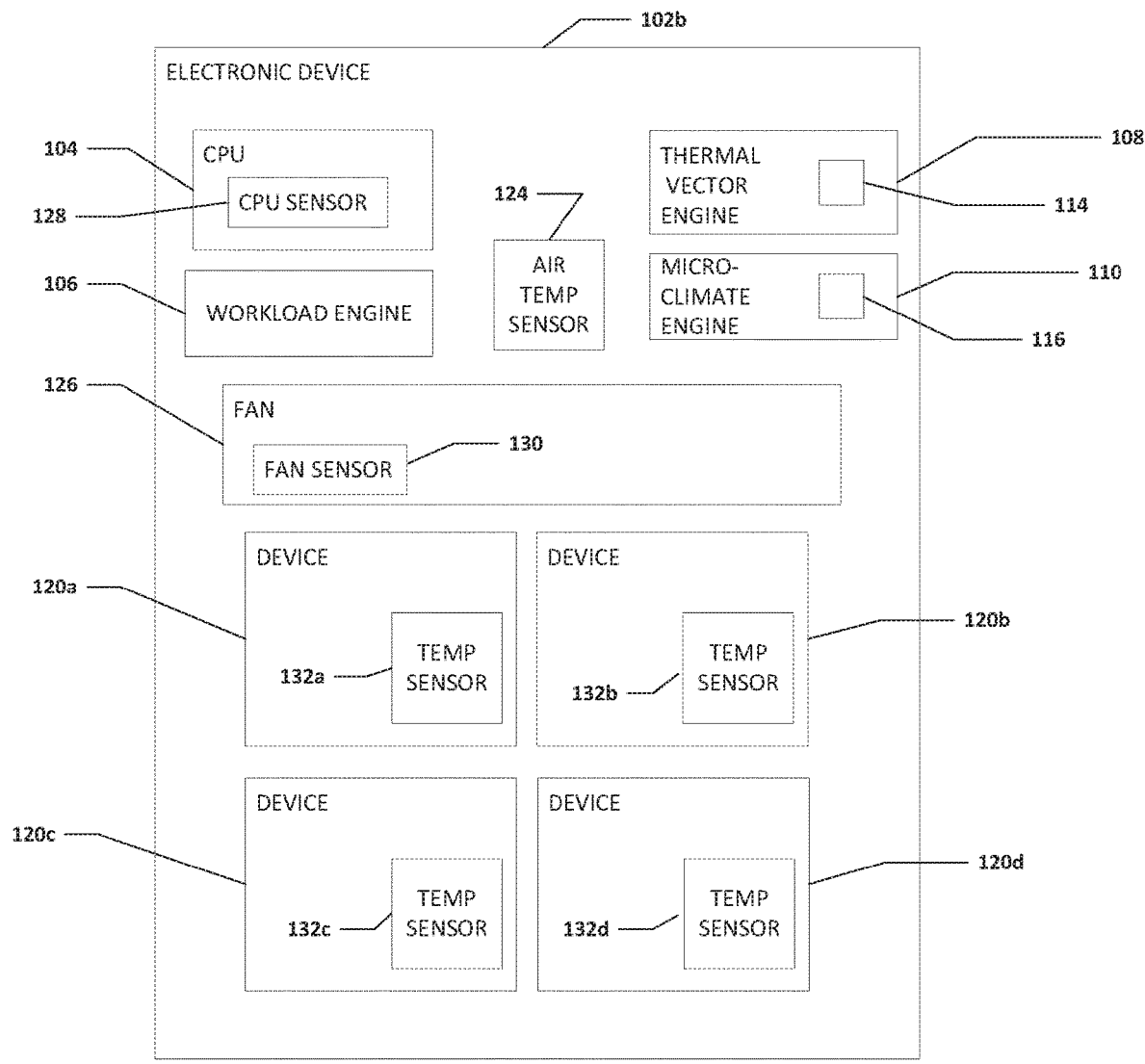
FIG. 2 is a simplified block diagram of a portion of a system to enable a disposition of a workload based on a thermal response of a device, in accordance with an embodiment of the present disclosure.

Turning to FIG. 2, FIG. 2 is a simplified block diagram of electronic device 102*b*. Electronic device 102*b* can include CPU 104, workload engine 106, thermal vector engine 108, micro-climate engine 110, plurality of devices 120*a*-120*d*, an air temperature sensor 124, and a fan 126. Air temperature sensor 120 can determine the temperature of the air going into fan 126 and report the determined temperature to micro-climate engine 110.

CPU 104 can include a CPU sensor 128. CPU sensor 128 can determine characteristics related to CPU 104 and report the determined characteristics to micro-climate engine 110. The characteristics related to CPU 104 can include the amount of processing being performed by CPU 104, the temperature of CPU 104, CPU speed, etc. Fan 126 can include a fan sensor 130. Fan sensor 130 can determine characteristics related to fan 126 and report the determined characteristics to micro-climate engine 110. The characteristics related to fan 126 can include fan speed, the temperature of the air entering and/or exiting fan 126, etc.

Each of devices 120a-120d can include a temperature sensor. For example, device 120a can include a temperature sensor 132a, device 120b can include a temperature sensor 132b, device 120c can include a temperature sensor 132c, and device 120d can include a temperature sensor 132d. Each temperature sensor can determine the temperature of the device that includes temperature sensor and communicate the determined temperature to micro-climate engine 110.

Turning to FIG. 3, FIG. 3 is a simplified block diagram illustrating example details of device thermal parameters table 116 for use in system 100, in accordance with an embodiment of the present disclosure. Device thermal parameters table 116 can include a thermal parameters table for each device 120a-120x in electronic device 102a. As illustrated in FIG. 3, device thermal parameters table 116 includes thermal parameters for device 120a and for device 120b (device thermal parameters table 116 can also include thermal parameters for devices 120c-120x). The thermal parameters related to each device are from different periods of time. The thermal parameters can include a time column 158, a temperature column 134, a device workload column 136, a fan speed column 138, a CPU speed column 140, a neighbor 1 temperature column 142, a neighbor 2 temperature column 144, and other thermal parameters that may be used to create a thermal vector for each device. Time column 158 indicates when the data was collected and it can be based on a system clock, a timer, or some other means that allows for an indication of when the data was collected.

The data in temperature column 134 can be acquired from a temperature sensor in the device associated with the temperature (e.g., temperature sensor 132a can collect temperature data for device 120a). The data in device workload column 136 can be acquired from workload engine 106 and is associated with a workload of the device. For example, if the device is as SSD, the workload may be a percentage of read/writes (e.g., 70/30 is equal to a workload that is reading 70% of the time and writing 30% of the time to the device, 50/60 is equal to a workload that is reading 50% of the time and writing 60% of the time), as such the workload power is proportional in some manner to the percentage of reads and writes. The data in fan speed column 138 can be acquired from fan sensor 130. The data in CPU speed column 140 can be acquired from CPU sensor 128. The data in neighbor 1 temperature column 142 can be acquired from a temperature sensor in a neighbor device. For example, device 120b can be considered as a neighbor to device 120a and temperature sensor 132b in device 120b can determine the temperature data for device 120b. The data in neighbor 2 temperature column 144 can be acquired from a temperature sensor in another neighbor device. For example, device 120c can be considered as another neighbor to device 120a and temperature sensor 132c in device 120c can determine the temperature data for device 120c. Other thermal parameters than those illustrated in device thermal parameters table 116 can also be included in device thermal parameters table 116 (e.g., the ambient air temperature or the air temperature going into a fan). For example, air temperature sensor 124 may determine the temperature of the air going into fan 126 and report the data for inclusion into device thermal parameters table 116. The data in device thermal parameters table 116 can be collected at periodic intervals, at the start of a workload, when a specific condition occurs (e.g., a flag is set or triggered by a temperature sensor, etc.), or some other predetermined event or events that can be used as a basis for collecting data. Thermal vector engine 108 can use the data in device thermal parameters table 116 to create a thermal vector for each device. The thermal vector for each device can be stored in thermal vector table 114.

Figure 4:
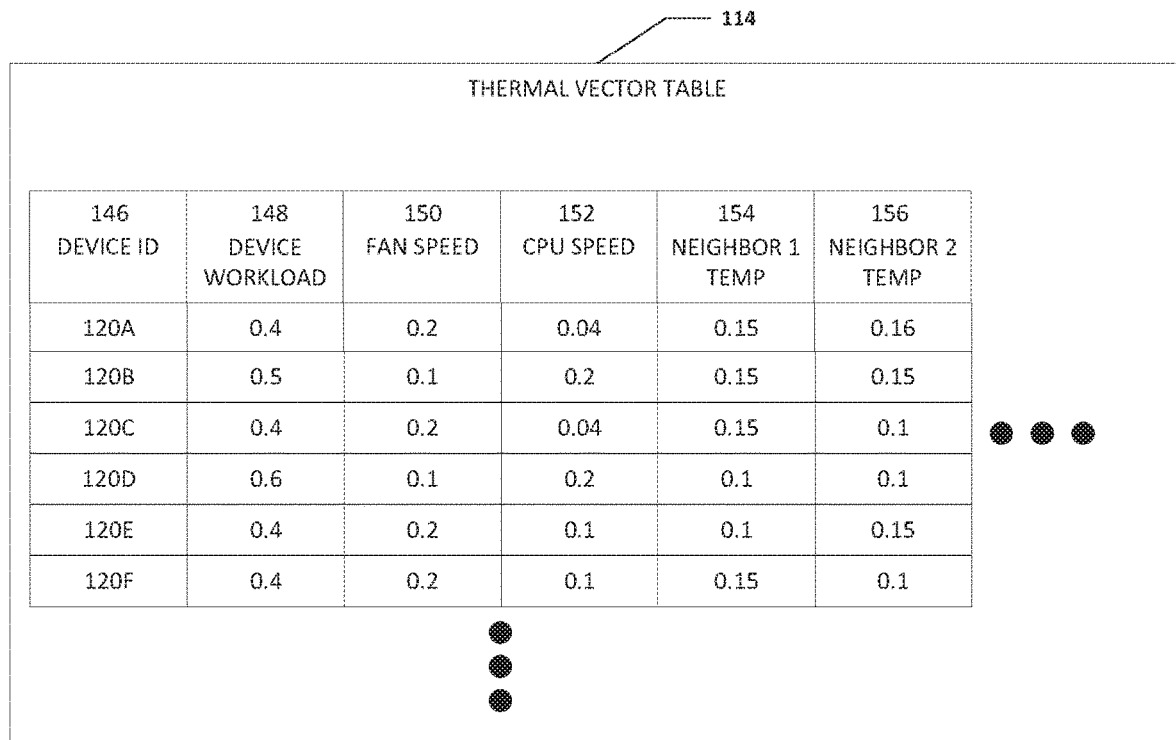
FIG. 4 is a simplified block diagram of a portion of a system to enable a disposition of a workload based on a thermal response of a device, in accordance with an embodiment of the present disclosure.

Turning to FIG. 4, FIG. 4 is a simplified block diagram of example details of thermal vector table 114 for use in system 100, in accordance with an embodiment of the present disclosure. Thermal vector table 114 can include a device identification (ID) column 146, a device workload contribution column 148, a fan speed contribution column 150, a CPU speed contribution column 152, a neighbor 1 temperature contribution column 154, a neighbor 2 temperature contribution column 156, and other contributing thermal parameters that may be used as part of a thermal vector for each device. Device ID column 146 includes an identification of a specific device.

Device workload contribution column 148 includes an indicator of the amount the workload of the specific device identified in device ID column 146 will affect the thermal characteristic of the specific device. Fan speed contribution column 150 includes an indicator of the amount the fan speed will affect the thermal characteristic of the specific device identified in device ID column 146. CPU speed contribution column 152 includes an indicator of the amount the CPU speed will affect the thermal response of the specific device identified in device ID column 146. Neighbor 1 temperature contribution column 154 includes an indicator of the amount the temperature of the device identified as neighbor 1 will affect the thermal response of the specific device identified in device ID column 146. Neighbor 2 temperature contribution column 156 includes an indicator of the amount the temperature of the device identified as neighbor 2 will affect the thermal response of the specific device identified in device ID column 146.

The indicators in device workload contribution column 148, fan speed contribution column 150, CPU speed contribution column 152, neighbor 1 temperature contribution column 154, neighbor 2 temperature contribution column 156, and other contributing thermal parameters can be weighted for each device. For example, a workload for device 120b may have a greater impact on the thermal response of device 120b than a workload for device 120a. Also, the CPU speed may have a have a greater impact on the thermal response of device 120a than for device 120b. The thermal parameters allow not just the primary influencers but also other indicators to be used when determining an individual device's thermal response.

When assigning a workload, workload engine 106 can use thermal vector table 114 to help predict the time duration from any given real-time thermal condition to when a device will reach its thermal limit, at which time the device performance must be throttled and data operations suffer to protect the device from overheating. Also, workload engine 106 can can use thermal vector table 114 to help analyze each workload mission write power, sub-power, and duration, to disposition each individual workload mission according to the thermal response impact the workload will have on each device. For example, each workload mission is evaluated against each device's current thermal state and its predicted thermal response based on each workload. This allows workload engine 106 to allocate workloads to respective devices that will complete the workload prior to a device reaching its thermal limit.

The indicators in device workload contribution column 148, fan speed contribution column 150, CPU speed contribution column 152, neighbor 1 temperature contribution column 154, neighbor 2 temperature contribution column 156, and other contributing thermal parameters can be used against real or hypothetical values to determine a thermal rate of change for a specific device. In a specific example, a workload can be received that will be assigned devices 120a, 120b, and 120c. The current thermal state, or temperature of each device can be determined. A plurality of scenarios can be analyzed using thermal vector table 114 to determine a workload for each device. More specifically, for each scenario the workload for each device can be varied. The fan speed and CPU speed should be relatively the same for each device but because of the different weight factors for each device, the fan speed and CPU speed will affect the thermal response of each device differently. For example, because device 120b has a higher weight (0.2) in CPU speed contribution column 152 than device 120a and 120c (0.04), a CPU speed will increase the thermal response of device 120b greater than devices 120a and 120c. The results of each scenario will be a thermal or temperature increase (or decrease) that can be added to the current thermal state or temperature of each device and can be used to determine the workload that should be assigned to each device such that each device will not reach its thermal limit or such that each device will be within a desired thermal range.

Figure 5:
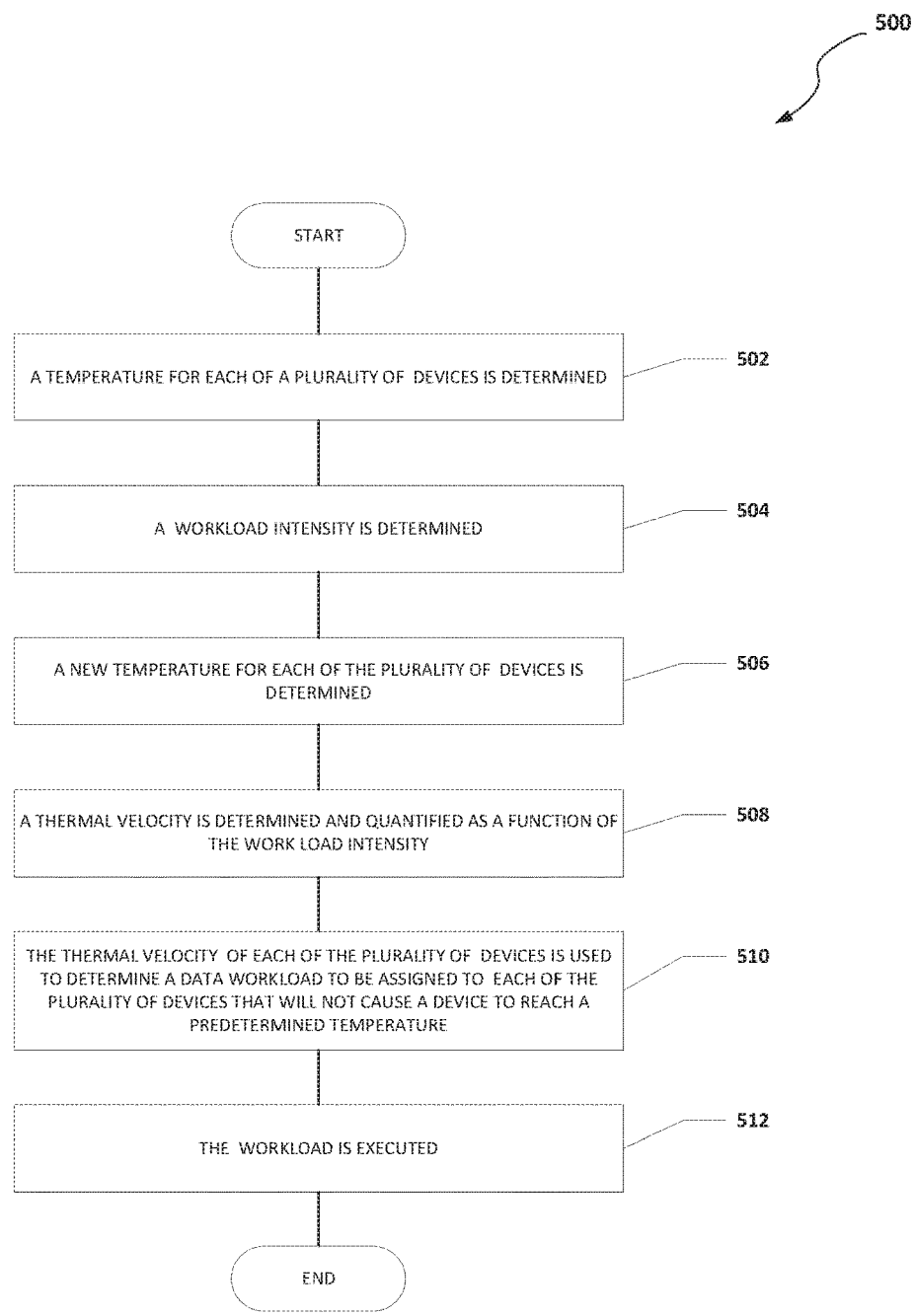
FIG. 5 is a simplified flowchart illustrating potential operations that may be associated with the system in accordance with an embodiment.

Turning to FIG. 5, FIG. 5 is an example flowchart illustrating possible operations of a flow 500 that may be associated with enabling a disposition of a workload based on a thermal response of a device, in accordance with an embodiment. In an embodiment, one or more operations of flow 500 may be performed by micro-climate engine 110, thermal vector engine 108, and/or workload engine 106. At 502, a temperature for each of a plurality of devices is determined. For example, a temperature for each device 120a-120p may be determined by a temperature sensor and communicated to micro-climate engine 110. At 504, a workload intensity is determined. For example, a workload intensity may be determined by workload engine 106 and communicated to micro-climate engine 110. At 506, a new temperature for each of the plurality of devices is determined. For example, a new temperature for each device 120a-120p may be determined and communicated to micro-climate engine 110. Micro-climate engine 110 can insert the temperature, workload intensity, and new temperature into a device thermal parameters table, similar to device thermal parameters table 116 illustrated in FIG. 3. At 508, a thermal velocity is determined and quantified as a function of the workload intensity. For example, thermal vector engine 108 can use the device thermal parameters table to create a thermal vector table, similar to thermal vector table 114 illustrated in FIG. 4, for each of the plurality of devices. At 510, the thermal velocity of each of the plurality of devices is used to determine a data workload to be assigned to each of the plurality of devices that will not cause a device to reach a predetermined temperature. The predetermined temperature may be a temperature that is at or about the device's thermal limit or may be a temperature that is outside of the devices preferred operating temperature range. For example, workload engine 106 can use data from lookup table 160 to plug into the thermal vector table to predict a thermal response of each of the plurality of devices based on a workload and assign a workload to each device that will not cause any of the devices to reach their thermal limits. At 512, the workload is executed.

Figure 6:
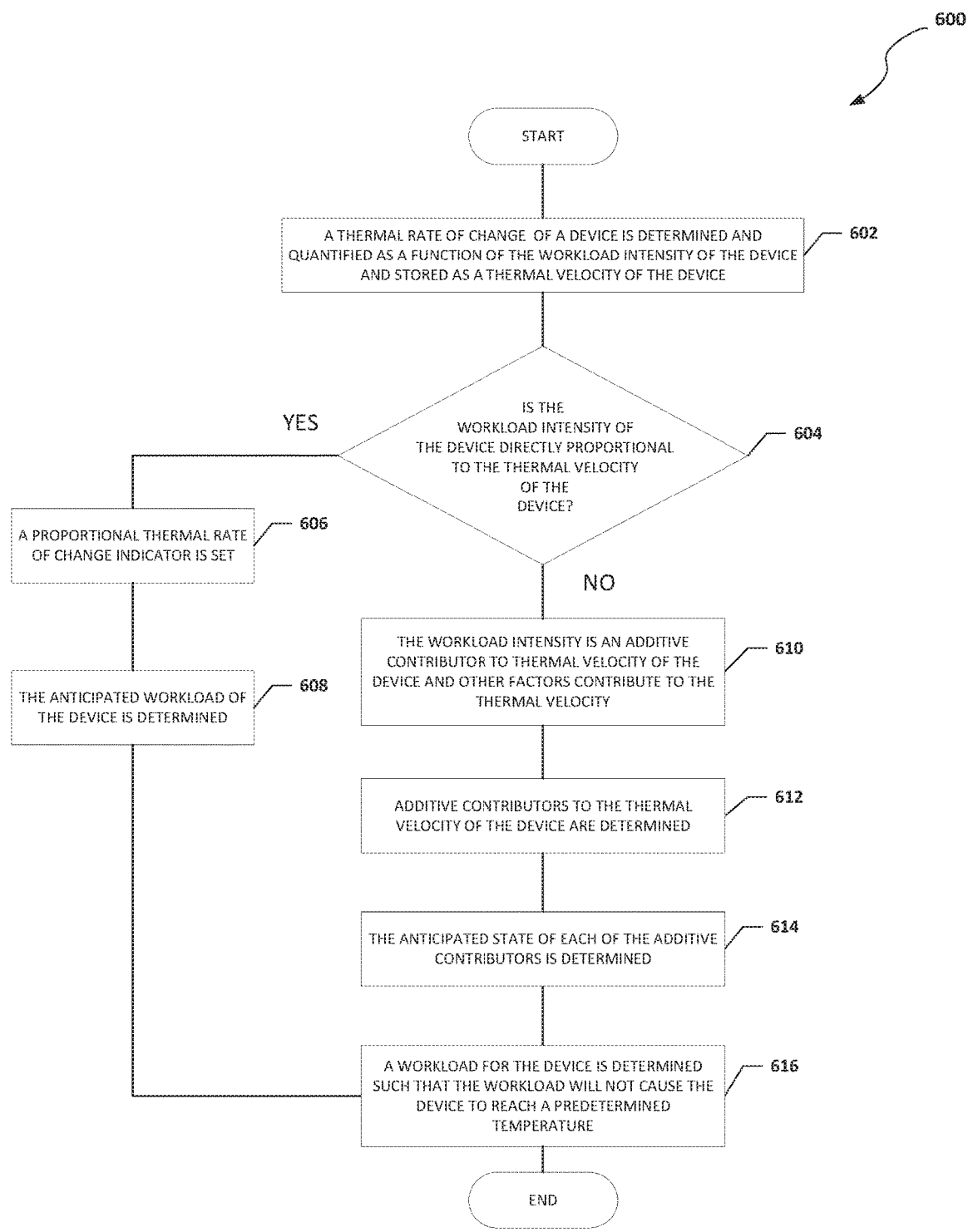
FIG. 6 is a simplified flowchart illustrating potential operations that may be associated with the system in accordance with an embodiment.

Turning to FIG. 6, FIG. 6 is an example flowchart illustrating possible operations of a flow 600 that may be associated with enabling a disposition of a workload based on a thermal response of a device, in accordance with an embodiment. In an embodiment, one or more operations of flow 600 may be performed by micro-climate engine 110, thermal vector engine 108, and/or workload engine 106. At 602, a thermal rate of change of a device is determined, quantified as a function of the workload intensity of the device, and stored as a thermal velocity of the device. At 602, the system determines if the workload intensity of the device is directly proportional to the thermal velocity of the device. If the workload intensity of the device is directly proportional to the thermal velocity of the device, then a proportional thermal rate of change indicator is set, as in 604. At 606, an anticipated workload of the device is determined. At 616, a workload for the device is determined such that the workload will not cause the device to reach a predetermined temperature. The predetermined temperature may be a temperature that is at or about the device's thermal limit or may be a temperature that is outside of the devices preferred operating temperature range.

If the workload intensity of the device is not directly proportional to the thermal velocity of the device, then the workload is an additive contributor to the thermal velocity of the device and other factors contribute to the thermal velocity of the device, as in 610. At 612, the additive contributors to the thermal velocity of the device are determined. For example, thermal vector engine 108 can use a device thermal parameters table to create a thermal vector table, similar to thermal vector table 114 illustrated in FIG. 4, and determine the thermal parameters that contribute to the thermal vector for the device. At 614, the anticipated state of each of the additive contributors is determined. At 616, a workload for the device is determined such that the workload will not cause the device to reach its thermal limit. For example, workload engine 106 can use data from lookup table 160 to plug into the thermal vector table to predict a thermal response of each of the plurality of devices based on a workload and assign a workload to each device that will not cause any of the devices to reach their thermal limits.

Figure 7:
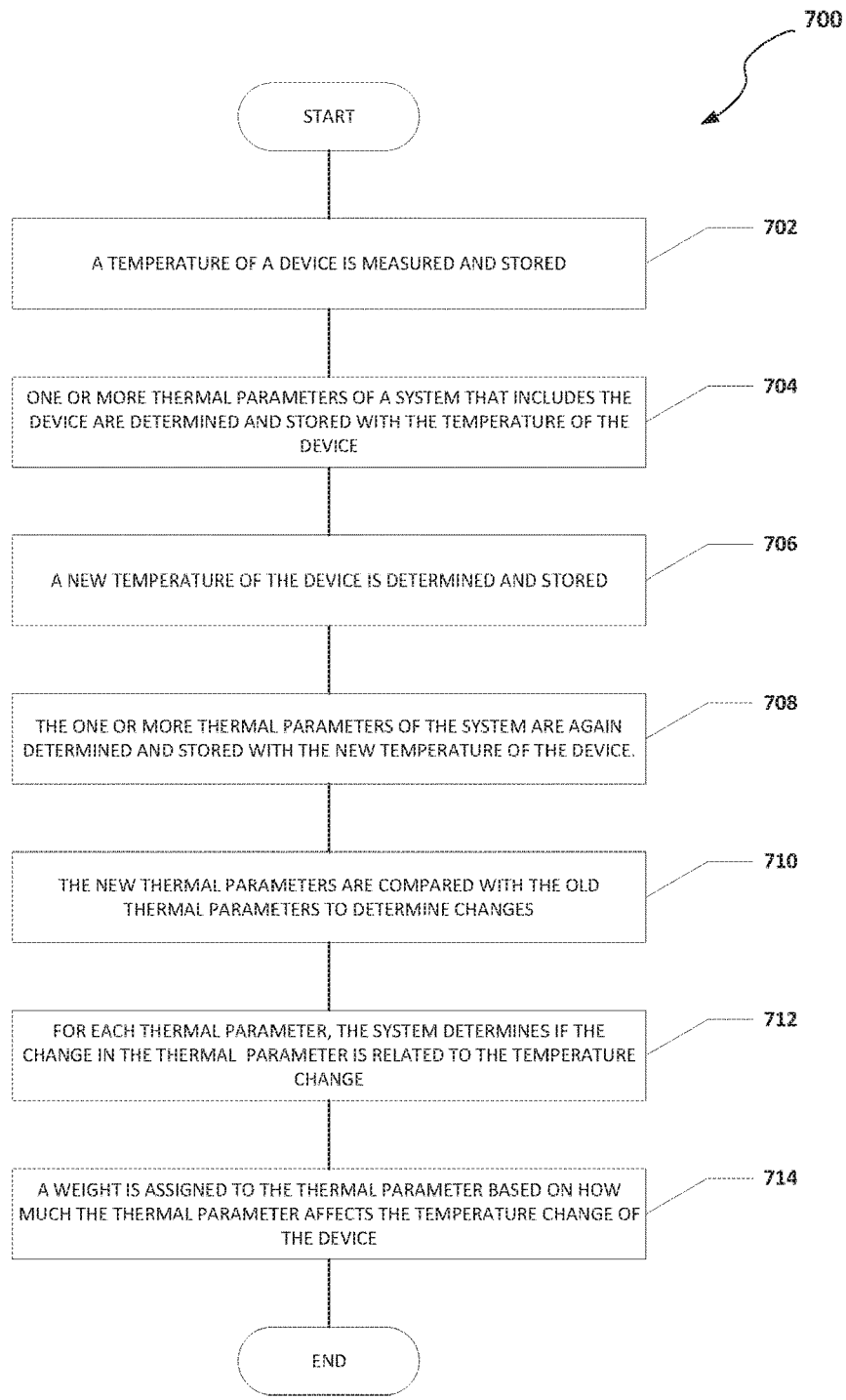
FIG. 7 is a simplified flowchart illustrating potential operations that may be associated with the system in accordance with an embodiment.

Turning to FIG. 7, FIG. 7 is is an example flowchart illustrating possible operations of a flow 700 that may be associated with enabling a disposition of a workload based on a thermal response of a device, in accordance with an embodiment. In an embodiment, one or more operations of flow 700 may be performed by micro-climate engine 110, thermal vector engine 108, and/or workload engine 106. At 702, a temperature of a device is measured and stored. At 704, one or more thermal parameters of a system that includes the device are determined and stored with the temperature of the device. At 706, a new temperature of the device is determined and stored. At 708, the one or more thermal parameters of the system are again determined and stored with the new temperature of the device. At 710, the new thermal parameters are compared with the old thermal parameters to determine changes. At 712, for each thermal parameter, the system determines if the changes in the thermal parameter is related to the temperature change. For example, thermal vector engine 108 can be configured to analyze a plurality of thermal parameters for a specific device and determine what thermal parameters affect the thermal response of the device. More specifically, thermal vector engine 108 can be configured to analyze a plurality of thermal parameters for a specific device and determine that a device workload for the device affects the thermal response of the device a relatively large amount or percentage, the fan speed affects the thermal response of the device a relatively medium amount or percentage, a temperature of a neighbor affects the thermal response of the device a relatively small amount or percentage, etc. At 714, a weight is assigned to the thermal parameter based on how much (if any) the thermal parameter affects the temperature change of the device. The process can be repeated multiple of times to determine the thermal influencers on a device and assign a weight to each of the thermal influencers. The results of the process can be used to create a thermal vector for the device similar to what is illustrated in thermal vector table 114 in FIG. 4.

Figure 8:
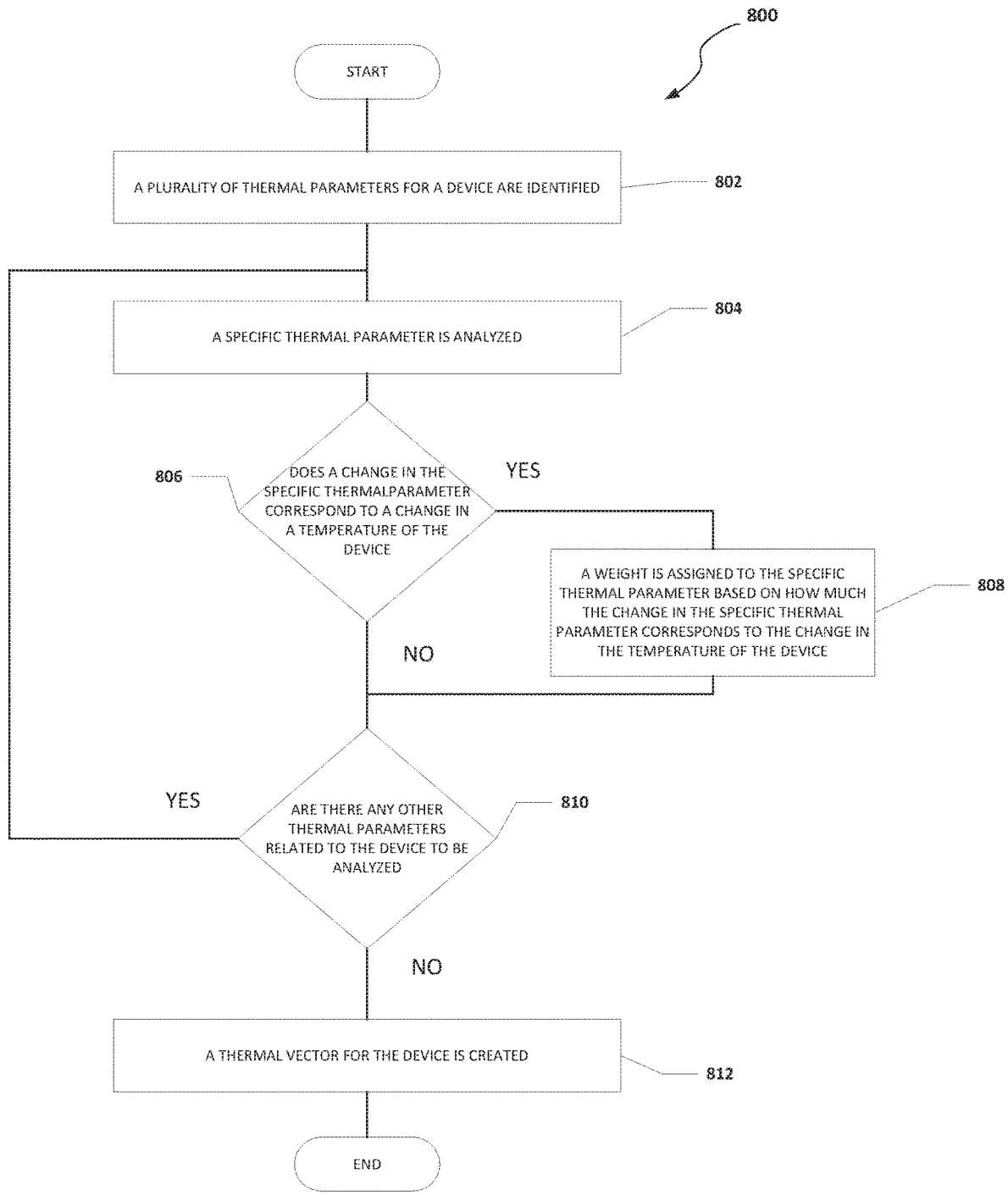
FIG. 8 is a simplified flowchart illustrating potential operations that may be associated with the system in accordance with an embodiment.

Turning to FIG. 8, FIG. 8 is an example flowchart illustrating possible operations of a flow 800 that may be associated with enabling a disposition of a workload based on a thermal response of a device, in accordance with an embodiment. In an embodiment, one or more operations of flow 800 may be performed by micro-climate engine 110, thermal vector engine 108, and/or workload engine 106. At 802, a plurality of thermal parameters for a device are identified. At 804, a specific thermal parameter is analyzed. At 806, the system determines if a change in the specific thermal parameter corresponds to a change in a temperature of the device. If the system determines a change in the specific thermal parameter corresponds to a change in a temperature of the device, then a weight is assigned to the specific thermal parameter based on how much the change in the specific thermal parameter corresponds to the change in the temperature of the device, as in 808. At 810, the system determines if there are any other thermal parameters related to the device to be analyzed.

If the system determines a change in the specific thermal parameter does not correspond to a change in the temperature of the device, then the system determines if there are any other thermal parameters related to the device to be analyzed, as in 810. If there are any other thermal parameters related to the device to be analyzed, then a (new) specific thermal parameter is analyzed, as in 804. If there are not any other thermal parameters related to the device to be analyzed, then a thermal vector for the device is created, as in 812.

It is also important to note that the operations in the preceding flow diagrams (i.e., FIGS. 5-8) illustrate only some of the possible correlating scenarios and patterns that may be executed by, or within, system 100. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by system 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although system 100 have been illustrated with reference to particular elements and operations that facilitate the communication process, these elements and operations may be replaced by any suitable architecture, protocols, and/or processes that achieve the intended functionality of system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Other Notes and Examples

Example C1 is at least one machine readable storage medium having one or more instructions that when executed by at least one processor, cause the at least one processor to receive a plurality of thermal parameters for a device, identify one or more of the plurality of thermal parameters that affect a thermal response of the device, and create a thermal vector for the device using the one or more of the plurality of thermal parameters that affect the thermal response of the device, where the thermal vector can be used to predict a new thermal response of the device.

In Example C2, the subject matter of Example C1 can optionally include where the thermal vector includes weighted thermal parameters.

In Example C3, the subject matter of any one of Examples C1-C2 can optionally include where the one or more instructions further cause the at least one processor to determine a workload for the device that will not cause the device to reach a thermal limit.

In Example C4, the subject matter of any one of Examples C1-C3 can optionally include where the thermal parameters include a workload, fan speed, computer processing unit speed, and a temperature of at least one neighbor.

In Example C5, the subject matter of any one of Examples C1-C4 can optionally include where the one or more instructions further cause the at least one processor to determine a second thermal vector for a second device, where the second thermal vector is different than the thermal vector.

In Example C6, the subject matter of any one of Examples C1-05 can optionally include where the one or more instructions further cause the at least one processor to determine a second thermal vector for a second device, where the thermal vector and the second thermal vector both include a specific thermal parameter and the specific thermal parameter is weighted higher in the second thermal vector than it is weighted in the thermal vector.

In Example C7, the subject matter of any one of Examples C1-C6 can optionally include where at least one of the plurality of devices is memory.

In Example C8, the subject matter of any one of Examples C1-C7 can optionally include where at least one of the plurality of devices is a solid-state device.

In Example A1, a system on a chip can include memory, a thermal vector engine, and at least one processor. The at least one processor is configured to cause the thermal vector engine to receive a plurality of thermal parameters for a device, identify one or more of the plurality of thermal parameters that affect a thermal response of the device, and create a thermal vector for the device using the one or more of the plurality of thermal parameters that affect the thermal response of the device, where the thermal vector can be used to predict a new thermal response of the device.

In Example A2, the subject matter of Example A1 can optionally include where the thermal vector includes weighted thermal parameters.

In Example A3, the subject matter of any one of Examples A1-A2 can optionally include where the at least one processor is further configured to cause the thermal vector engine to determine a second thermal vector for a second device, where the second thermal vector is different than the thermal vector.

In Example A4, the subject matter of any one of Examples A1-A3 can optionally include where the at least one processor is further configured to cause the thermal vector engine to determine a second thermal vector for a second device, where the thermal vector and the second thermal vector both include a specific thermal parameter and the specific thermal parameter is weighted higher in the second thermal vector than it is weighted in the thermal vector.

In Example A5, the subject matter of any one of Examples A1-A4 can optionally include where at least one of the plurality of devices is memory.

Example M1 is a method including receiving a plurality of thermal parameters for a device, identifying one or more of the plurality of thermal parameters that affect a thermal response of the device, and creating a thermal vector for the device using the one or more of the plurality of thermal parameters that affect the thermal response of the device, where the thermal vector can be used to predict a new thermal response of the device.

In Example M2, the subject matter of Example M1 can optionally include where the thermal vector includes weighted thermal parameters.

In Example M3, the subject matter of any one of the Examples M1-M2 can optionally include determining a workload for the device that will not cause the device to reach a thermal limit.

In Example M4, the subject matter of any one of the Examples M1-M3 can optionally include determining a second thermal vector for a second device, where the second thermal vector is different than the thermal vector.

In Example M5, the subject matter of any one of the Examples M1-M4 can optionally include determining a second thermal vector for a second device, where the thermal vector and the second thermal vector both include a specific thermal parameter and the specific thermal parameter is weighted higher in the second thermal vector than it is weighted in the thermal vector.

In Example M6, the subject matter of any one of Examples M1-M5 can optionally include where at least one of the plurality of devices is memory.

Example S1 is a system for enabling a disposition of a workload based on a thermal response of a device. The system can include memory, one or more processors, and a thermal vector engine. The thermal vector engine is configured to receive a plurality of thermal parameters for a device, identifying one or more of the plurality of thermal parameters that affect a thermal response of the device, create a thermal vector for the device using the one or more of the plurality of thermal parameters that affect the thermal response of the device, and communicate the thermal vector to a workload engine, where the workload engine can use the thermal vector to predict a new thermal response of the device and determine a workload for the device that will not cause the device to reach a thermal limit.

In Example S2, the subject matter of Example S1 can optionally include where the thermal vector includes weighted thermal parameters.

In Example S3, the subject matter of any one of the Examples S1-52 can optionally include where the thermal parameters include a workload, fan speed, computer processing unit speed, and a temperature of at least one neighbor.

In Example S4, the subject matter of any one of the Examples S1-53 can optionally include where the thermal vector engine is further configured to determine a second thermal vector for a second device, where the second thermal vector is different than the thermal vector.

In Example S5, the subject matter of any one of the Examples S1-54 can optionally include where the thermal vector engine is further configured to determine a second thermal vector for a second device, where the thermal vector and the second thermal vector both include a specific thermal parameter and the specific thermal parameter is weighted higher in the second thermal vector than it is weighted in the thermal vector.

In Example S6, the subject matter of any one of the Examples S1-55 can optionally include where at least one of the plurality of devices is memory.

In Example S7, the subject matter of any one of the Examples S1-56 can optionally include where at least one of the plurality of devices is a solid-state drive.

Example AA1 is an apparatus including means for receiving a plurality of thermal parameters for a device, means for identifying one or more of the plurality of thermal parameters that affect a thermal response of the device, and means for creating a thermal vector for the device using the one or more of the plurality of thermal parameters that affect the thermal response of the device, where the thermal vector can be used to predict a new thermal response of the device.

In Example AA2, the subject matter of Example AA1 can optionally include where the thermal vector includes weighted thermal parameters.

In Example AA3, the subject matter of any one of Examples AA1-AA2 can optionally include means for determining a workload for the device that will not cause the device to reach a thermal limit.

In Example AA4, the subject matter of any one of Examples AA1-AA3 can optionally include where the thermal parameters include a workload, fan speed, computer processing unit speed, and a temperature of at least one neighbor.

In Example AA5, the subject matter of any one of Examples AA1-AA4 can optionally include means for determining a second thermal vector for a second device, where the second thermal vector is different than the thermal vector.

In Example AA6, the subject matter of any one of Examples AA1-AA5 can optionally include means for determining a second thermal vector for a second device, where the thermal vector and the second thermal vector both include a specific thermal parameter and the specific thermal parameter is weighted higher in the second thermal vector than it is weighted in the thermal vector.

In Example AA7, the subject matter of any one of Examples AA1-AA6 can optionally include where at least one of the plurality of devices is memory.

In Example AA8, the subject matter of any one of Examples AA1-AA9 can optionally include where at least one of the plurality of devices is a solid-state device.

Example X1 is a machine-readable storage medium including machine-readable instructions to implement a method or realize an apparatus as in any one of the Examples A1-A5, AA1-AA8, or M1-M6. Example Y1 is an apparatus comprising means for performing any of the Example methods M1-M6. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. At least one non-transitory machine readable medium comprising one or more instructions that, when executed by at least one processor, causes the at least one processor to:
   receive a plurality of thermal parameters for a plurality of solid-state storage devices (SSD) of an SSD platform of a data center;
   identify one or more of the plurality of thermal parameters that affect a thermal response of the SSD platform; and
   create a thermal parameter data structure for the SSD platform using the one or more of the plurality of thermal parameters that affect the thermal response of the device,
   wherein the thermal parameter data structure can be used to predict a time to throttle for one or more of the SSDs, wherein the thermal parameters include a workload, fan speed, computer processing unit speed, and temperatures of a neighbor in a neighbor device and another neighbor in another neighbor device.

2. The at least one non-transitory machine readable medium of claim 1, wherein the thermal parameter data structure includes weighted thermal parameters.

3. The at least one non-transitory machine readable medium of claim 1, wherein the one or more instructions further cause the at least one processor to: determine a workload for the device that will not cause the device to reach a thermal limit.

4. The at least one non-transitory machine readable medium of claim 1, wherein the one or more instructions further cause the at least one processor to:
   determine a second thermal parameter data structure for a second device, wherein the second thermal parameter data structure is different than the thermal parameter data structure.

5. The at least one non-transitory machine readable medium of claim 1, wherein the one or more instructions further cause the at least one processor to:
   determine a second thermal parameter data structure for a second device, wherein the thermal parameter data structure and the second thermal parameter data structure both include a specific thermal parameter and the specific thermal parameter is weighted higher in the second thermal parameter data structure than the specific thermal parameter is weighted in the thermal parameter data structure.

6. The at least one non-transitory machine readable medium of claim 1, wherein the device is memory.

7. A system on chip (SOC) comprising:
   memory;
   a thermal circuit to construct a thermal parameter data structure; and
   at least one processor, wherein the at least one processor is configured to cause the thermal circuit to:
   receive a plurality of thermal parameters for a solid state drive (SSD) device of an SSD hardware platform of a data center;
   identify one or more of the plurality of thermal parameters that affect a thermal response of the SSD device; and
   create a thermal parameter data structure for the device using the one or more of the plurality of thermal parameters that affect the thermal response of the SSD device, wherein the thermal parameter data structure can be used to predict a time to throttle for the SSD, wherein the thermal parameters include a workload, fan speed, computer processing unit speed, and temperatures of a neighbor in a neighbor device and another neighbor in another neighbor device.

8. The SoC of claim 7, wherein the thermal parameter data structure includes weighted thermal parameters.

9. The SoC of claim 7, wherein the at least one processor is further configured to cause the thermal circuit to:
   determine a second thermal parameter data structure for a second SSD device, wherein the second thermal parameter data structure is different than the thermal parameter data structure.

10. The SoC of claim 7, wherein the at least one processor is further configured to cause the thermal circuit to: determine a second thermal parameter data structure for a second SSD device, wherein the thermal parameter data structure and the second thermal parameter data structure both include a specific thermal parameter and the specific thermal parameter is weighted higher in the second thermal parameter data structure than the specific thermal parameter is weighted in the thermal parameter data structure.

11. A method comprising:
   receiving a plurality of thermal parameters for a solid-state drive (SSD) device of an SSD hardware platform of a data center;
   identifying one or more of the plurality of thermal parameters that affect a thermal response of the SSD device; and
   creating a thermal parameter data structure for the device using the one or more of the plurality of thermal parameters that affect the thermal response of the device, wherein the thermal parameter data structure can be used to predict a time to throttle for one or more of the SSDs, wherein the thermal parameters include a workload, fan speed, computer processing unit speed, and temperatures of a neighbor in a neighbor device and another neighbor in another neighbor device.

12. The method of claim 11, wherein the thermal parameter data structure includes weighted thermal parameters.

13. The method of claim 11, further comprising: determining a workload for the device that will not cause the SSD device to reach a thermal limit.

14. The method of claim 11, further comprising:
   determining a second thermal parameter data structure for a second SSD device, wherein the second thermal parameter data structure is different than the thermal parameter data structure.

15. The method of claim 11, further comprising:
   determining a second thermal parameter data structure for a second SSD device, wherein the thermal parameter data structure and the second thermal parameter data structure both include a specific thermal parameter and the specific thermal parameter is weighted higher in the second thermal parameter data structure than the specific thermal parameter is weighted in the thermal parameter data structure.

16. A system for enabling a disposition of a workload based on a thermal response of a device, the system comprising:
   memory;

one or more processors; and a thermal circuit, wherein the thermal circuit is configured to:

receive a plurality of thermal parameters for a solid-state drive (SSD) device of an SSD hardware platform of a data center;

identifying one or more of the plurality of thermal parameters that affect a thermal response of the device, wherein the thermal parameters include a workload, fan speed, computer processing unit speed, and temperatures of a neighbor in a neighbor device and another neighbor in another neighbor device;

create a thermal parameter data structure for the SSD device using the one or more of the plurality of thermal parameters that affect the thermal response of the device; and communicate the thermal parameter data structure to a workload circuit, wherein the workload circuit can use the thermal parameter data structure to predict a new thermal response of the device and determine a workload for the SSD device that will not cause the SSD device to reach a thermal limit, wherein the new thermal response is based at least in part on a predicted time to throttle the SSD.

17. The system of claim 16, wherein the thermal parameter data structure includes weighted thermal parameters.

18. The system of claim 16, wherein the thermal parameters include a workload, fan speed, computer processing unit speed, and a temperature of at least one neighbor.

19. The system of claim 16, wherein the thermal circuit is further configured to:

determine a second thermal parameter data structure for a second SSD device, wherein the second thermal parameter data structure is different than the thermal parameter data structure.

20. The system of claim 16, wherein the thermal circuit is further configured to:

determine a second thermal parameter data structure for a second SSD device, wherein the thermal parameter data structure and the second thermal parameter data structure both include a specific thermal parameter and the specific thermal parameter is weighted higher in the second thermal parameter data structure than the specific thermal parameter is weighted in the thermal parameter data structure.

\* \* \* \* \*